(12) United States Patent
Niino et al.

(10) Patent No.: US 8,497,223 B2
(45) Date of Patent: *Jul. 30, 2013

(54) PROCESS FOR THE PRODUCTION OF DDR-TYPE ZEOLITE MEMBRANES

(75) Inventors: Makiko Niino, Nagoya (JP); Kenji Yajima, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/214,590

(22) Filed: Aug. 22, 2011

(65) Prior Publication Data

US 2011/0301017 A1    Dec. 8, 2011

Related U.S. Application Data (63) Continuation of application No. PCT/JP2010/052578, filed on Feb. 15, 2010.

(30) Foreign Application Priority Data

Mar. 6, 2009 (JP) ................................ 2009-054290

(51) Int. Cl.
*B01J 20/28* (2006.01)
*B01J 35/00* (2006.01)
*B01J 29/06* (2006.01)

(52) U.S. Cl.
USPC ......... 502/4; 502/60; 502/63; 502/64; 502/70

(58) Field of Classification Search
USPC ..................................... 502/4, 60, 63, 64, 70
See application file for complete search history.

(56) References Cited

U.S. PATENT DOCUMENTS

| | | | |
|---|---|---|---|
| 4,800,187 A | 1/1989 | Lachman et al. | |
| 2004/0173094 A1 | 9/2004 | Nakayama et al. | |
| 2005/0229779 A1 | 10/2005 | Nakayama et al. | |
| 2006/0144239 A1 * | 7/2006 | Suzuki et al. | 96/108 |
| 2008/0047432 A1 * | 2/2008 | Nonaka et al. | 96/11 |
| 2008/0214686 A1 | 9/2008 | Suzuki et al. | |
| 2009/0011926 A1 | 1/2009 | Yajima et al. | |

FOREIGN PATENT DOCUMENTS

| | | |
|---|---|---|
| JP | 01-148771 A1 | 6/1989 |
| JP | 2003-159518 A1 | 6/2003 |
| JP | 2004-066188 A1 | 3/2004 |
| JP | 2004-083375 A1 | 3/2004 |
| JP | 2004-105942 A1 | 4/2004 |
| WO | 2007/058387 A1 | 5/2007 |
| WO | 2007/105407 A1 | 9/2007 |

OTHER PUBLICATIONS

Tomita et al., "Gas separation characteristics of DDR type zeolite membrane", Microporous and Mesoporous Materials, 68 (2004), pp. 71-75.*

W.M. Meier, et al., "*Atlas of Zeolite Structure Types*," Fourth Edition, Elsevier, 1996.

M.J. den Exter, et al., "*Separation of Permanent Gases on the All-Silica 8-Ring Clathrasil DD3R*," Zeolites in Related Microporous Materials: State of the Art 1994, Studies in Surface Science and Catalysis, vol. 84, pp. 1159-1166.

* cited by examiner

*Primary Examiner* — Elizabeth Wood
(74) *Attorney, Agent, or Firm* — Burr & Brown (57) ABSTRACT

A process for production of a DDR-type zeolite membrane, which comprises: both a seed crystal-forming step of immersing a porous substrate in a seed crystal-forming raw material solution which contains a DDR-type zeolite powder dispersed therein and performing hydrothermal synthesis to form plural DDR-type zeolite crystal particles on surface of the porous substrate, and a membrane-forming step of immersing the resulting porous substrate with DDR-type zeolite crystal particles on the surface in a membrane-forming raw material solution which is free from DDR-type zeolite powder and performing hydrothermal synthesis to form a DDR-type zeolite membrane on the surface of the porous substrate. According to the process, a dense DDR-type zeolite membrane can be formed, and the vessel used in the synthesis can be prevented from being damaged.

19 Claims, 2 Drawing Sheets

PROCESS FOR THE PRODUCTION OF DDR-TYPE ZEOLITE MEMBRANES

FIELD OF THE INVENTION

The present invention relates to a process for the production of a DDR-type zeolite membrane. More specifically, the present invention relates to a DDR-type zeolite membrane production process capable of producing a dense DDR-type zeolite membrane and inhibiting a damage of a vessel used for synthesis.

BACKGROUND OF THE INVENTION

Zeolite is used as a catalyst, a catalyst carrier, an adsorbent, and the like. In addition, a zeolite membrane-disposed article where a membrane is formed on a surface of a porous substrate made of metal or ceramic is used as a gas separation membrane and a pervaporation membrane by using a molecular sieve function of zeolite.

There are any kinds of zeolite such as LTA, MFI, MOR, AFI, FER, FAU, and DDR depending on the crystal structure. Of these, DDR (Deca-Dodecasil 3R) type zeolite is a crystal having silica as the main component, and it is known that the pore is formed by a polyhedron containing an oxygen eight-membered ring and that the oxygen eight-membered ring has a pore size of 4.4×3.6 angstrom (see W. M. Meier, D. H. Olson, Ch. Baerlocher, Atlas of zeolite structure types, Elsevier (1996)).

The DDR-type zeolite has a relatively small pore size among zeolite and has the possibility that it can be used as a molecular sieve for low molecular gas such as carbon dioxide ($CO_2$), methane ($CH_4$), and ethane ($C_2H_6$).

As a process of the production of DDR-type zeolite, there is disclosed a production process capable of producing a dense DDR-type zeolite membrane for a short period of time by specifying the content rate of 1-adamantanamine, silica, water, and ethylenediamine in the raw material solution (see, e.g., Patent Document 1). This process exhibits an excellent effect of being capable of producing a dense DDR-type zeolite membrane in a short period of time.

Prior Art Patent Document

Patent Document 1: JP-A-2003-159518

The process of the production of a DDR-type zeolite membrane described in the Patent Document 1 exhibits an excellent effect of being able to produce a DDR-type zeolite membrane on a flat plate in a short period of time. However, since, in the process, a DDR-type zeolite membrane is formed by hydrothermal synthesis in the presence of a seed crystal (DDR-type zeolite powder), the resulting DDR-type zeolite membrane not necessarily has good density because of the influence of the seed crystal present upon the hydrothermal synthesis. In addition, since the DDR-type zeolite membrane is formed by utilizing precipitation and lamination of DDR-type zeolite particles in this process, a large amount of DDR particles precipitate in a place besides the substrate under conditions where a membrane can be formed. Therefore, since the precipitated DDR particles form a hard aggregate and adhere to the inside portion of the synthesis vessel to act as a factor of a damage of the synthesis vessel upon removal from the vessel, further improvement has been desired.

SUMMARY OF THE INVENTION

The present invention has been made in view of such prior art problems and is characterized in that a dense DDR-type zeolite membrane can be produced and that the process of the production of a DDR-type zeolite membrane capable of inhibiting a damage of the vessel used for the synthesis is provided.

According to the present invention, there is provided the following process of the production of a DDR-type zeolite membrane.

According to a first aspect of the present invention, a process for the production of a DDR-type zeolite membrane is provided, which comprises: a seed crystal-forming step of immersing a porous substrate in a seed crystal-forming raw material solution containing 1-adamantanamine, silica, water, and a DDR-type zeolite powder dispersed therein and performing hydrothermal synthesis to form plural DDR-type zeolite crystal particles on a surface of the porous substrate, and a membrane-forming step of immersing the porous substrate with DDR-type zeolite crystal particles formed on the surface thereof in the membrane-forming raw material solution containing 1-adamantanamine, silica, water, and no DDR-type zeolite powder and performing hydrothermal synthesis to form a DDR-type zeolite membrane on the surface of the porous substrate.

According to a second aspect, the process for the production of a DDR-type zeolite membrane according to the first aspect is provided, wherein the seed crystal-forming step is performed plural times with preparing the seed crystal-forming raw material solution each time the seed crystal-forming step is perfbrmed.

According to a third aspect the process for the production of a DDR-type zeolite membrane according to the first or second aspects is provided, wherein the membrane-forming step is performed plural times with preparing the membrane-forming raw material solution each time the membrane-forming step is performed.

According to a fourth aspect, the process for the production of a DDR-type zeolite membrane according to any one of the first to third aspects is provided, wherein ethylenediamine is contained in both the seed crystal-forming raw material solution used in the seed crystal-forming step and the membrane-forming raw material solution used in the membrane-forming step.

According to a fifth aspect, the process for the production of a DDR-type zeolite membrane according to any one of the first to fourth aspects is provided, wherein the hydrothermal synthesis in the seed crystal-forming step and the hydrothermal synthesis in the membrane-forming step are performed at 100 to 200° C.

According to a sixth aspect, the process for the production of a DDR-type zeolite membrane according to any one of the first to fifth aspects is provided, wherein the resulting DDR-type zeolite membrane has a thickness of 0.1 to 100 μm.

According to a seventh aspect, the process for the production of DDR-type zeolite crystal particles is provided, comprising: immersing a porous substrate in a raw material solution containing 1-adamantanamine, silica, water, and a DDR-type zeolite powder dispersed therein and performing hydrothermal synthesis to form a plural DDR-type zeolite crystal particle on the surface of the porous substrate.

In a process of the production of a DDR-type zeolite membrane of the present invention, since plural DDR-type zeolite crystal particles are formed on the surface of the porous substrate by hydrothermal synthesis by the use of a seed crystal-forming raw material solution containing a DDR-type zeolite powder therein in the "seed crystal-forming step", and then a DDR-type zeolite membrane is formed on the surface of the porous substrate by hydrothermal synthesis by the use of a membrane-forming raw material solution containing no DDR-type zeolite powder in the "membrane-forming step"; a dense DDR-type zeolite membrane can be produced, and a damage of the vessel used for the synthesis can be inhibited. In particular, since no DDR-type zeolite powder is contained in the raw material solution in the "membrane-forming step", a dense DDR-type zeolite membrane can be obtained.

DETAILED DESCRIPTION OF THE INVENTION

Hereinbelow, the best embodiment for carrying out the present invention will specifically be described with referring to drawings. However, the present invention is by no means limited to the following embodiment, and it should be understood that changes, improvements, and the like of the design may suitably be made on the basis of ordinary knowledge of a person of ordinary skill in the range of not deviating from the gist of the present invention.

(1) Seed Crystal-Forming Step:

In an embodiment of a process of the production of a DDR-type zeolite membrane of the present invention, the seed crystal-forming step is a step where a porous substrate is immersed in a seed crystal-forming raw material solution containing 1-adamantanamine, silica, water, and a DDR-type zeolite powder dispersed therein, and hydrothermal synthesis is performed to form plural DDR-type zeolite crystal particles on the surface of the porous substrate. The DDR-type zeolite crystal particles obtained in this step playa role of seed crystals upon forming a DDR-type zeolite membrane in the membrane-forming step. This step is one embodiment of a process of the production of DDR-type zeolite crystal particles of the present invention. Therefore, the description of "(1) seed crystal-forming step" also functions as the description of a process of the production of DDR-type zeolite crystal particles of the present invention.

(1-1) Seed Crystal-Forming Raw Material Solution:

The seed crystal-forming raw material solution contains 1-adamantanamine, silica, water, and a DDR-type zeolite powder dispersed therein. Ethylenediamine and other additives may be mixed in the solution. 1-adamantanamine is a structure directing agent for forming DDR-type zeolite crystal particles. For example, when a slight amount of sodium aluminate is used as an additive, a part of Si constituting the DDR-type zeolite membrane can be substituted with Al. Such substitution enables to add catalysis and the like in addition to a separation function to the resulting DDR-type zeolite membrane. Upon preparing a seed crystal-forming raw material solution, the ratio of 1-adamantanamine to silica (1-adamantanamine/silica (molar ratio)) is preferably 0.002 to 0.5, further preferably 0.002 to 0.2. When the ratio is smaller than 0.002, 1-adamantanamine as the structure directing agent becomes insufficient to make the formation of DDR-type zeolite difficult. When the ratio is larger than 0.5, since the amount of 1-adamantanamine used increases, the production costs may increase. The ratio of water to silica (water/silica (molar ratio)) is preferably 10 to 500, further preferably 10 to 200. When the ratio is smaller than 10, the silica concentration is too high, which may make the formation of DDR-type zeolite difficult. When the ratio is larger than 500, the silica concentration is too low, which may make the formation of DDR-type zeolite difficult.

It is preferable that ethylenediamine is contained in the seed crystal-forming raw material solution. The preparation of the seed crystal-forming raw material solution with adding ethylenediamine enables to dissolve 1-adamantanamine easily and produce a DDR-type zeolite powder having a uniform crystal size. The ratio of ethylenediamine to 1-adamantanamine (ethylenediamine/1-adamantanamine (molar ratio)) is preferably 4 to 35, further preferably 8 to 32. When the ratio is smaller than 4, the amount of ethylenediamine is insufficient for easily dissolving 1-adamantanamine. When the ratio is larger than 35, the ethylenediamine not contributing to the reaction is superfluous, which may increase the production costs.

In addition, it is preferable to prepare 1-adamantanamine by dissolving 1-adamantanamine in ethylenediamine in advance. By the use of a seed crystal-forming raw material solution prepared by mixing the thus prepared 1-adamantanamine solution with the silica sol solution containing silica, it becomes possible to solve. 1-adamantanamine more easily and completely and produce a DDR-type zeolite powder having a uniform crystal size. Incidentally, though the silica sol solution can be prepared by dissolving fine powder-formed silica in water or by subjecting alkoxide to hydrolysis, it is also possible to use a silica sol marketed product with adjusting the silica concentration.

(1-2) Porous Substrate:

There is no particular limitation on the shape of the porous substrate used in a process of the production of DDR-type zeolite membrane of the present embodiment, and the shape may be an arbitrary shape according to the use. Suitable examples of the shape include a plate-like shape, a cylindrical shape, a honeycomb shape, and a monolith shape. Of these, a monolith shape is preferable because the membrane area per unit volume can be made large and because the sealed portion area per membrane area can be made small. Incidentally, the "monolith shape" referred to in the present embodiment means a columnar shape having plural through-holes passing through in the central axial direction, for example, a shape having a lotus root shape of a cross section perpendicular to the central axial direction. Hereinbelow, the case that the porous substrate has a monolith shape as described above (monolith-shaped substrate) will be described. However, the shape of the porous substrate is not limited to this shape as described above.

The method for producing the porous substrate is not particularly limited, and a known method can be employed. For example, a forming raw material containing a predetermined ceramic raw material is kneaded and subjected to extrusion forming using a die by which a monolith-shaped formed article can be formed to obtain a monolith-shaped formed article. Then, drying and firing are performed to obtain a monolith-shaped porous substrate.

(1-3) Hydrothermal Synthesis:

By immersing the porous substrate in a seed crystal-forming raw material solution containing a DDR-type zeolite powder and subjecting the porous substrate to hydrothermal synthesis, DDR-type zeolite crystal particles are formed on the surface of the porous substrate. When the DDR-type zeolite crystal particles are formed on the surface of the porous substrate by hydrothermal synthesis, it is preferable to mask a portion where no DDR-type zeolite crystal particle is formed on the surface of the porous substrate with a PTFE (polytetrafluoroethylene) seal tape or the like lest any DDR-type zeolite crystal particle should be formed. As a method for subjecting DDR-type zeolite to hydrothermal synthesis with immersing a porous substrate in a seed crystal-forming raw material solution, the following method can be employed.

Hydrolysis is performed by putting a porous substrate in a pressure resistant vessel or the like containing a seed crystal-forming raw material solution with maintaining it at the predetermined temperature described below for a predetermined period of time to form DDR-type zeolite crystal particles on the surface of the porous substrate. In the seed crystal-forming step, the temperature for the hydrothermal synthesis is preferably 100 to 200° C., further preferably 100 to 150° C. When the hydrothermal synthesis is performed at a temperature below 100° C., the formation of DDR-type zeolite crystal particles may be difficult. When the hydrothermal synthesis is performed at a temperature above 200° C., a crystal phase different from that of DDR-type zeolite, such as DOH-type zeolite, may be formed.

It is preferable that the DDR-type zeolite crystal particles formed on the surface of the porous substrate has a particulate diameter of 10 μm or less. When it is larger than 10 μm, the density of the resulting DDR-type zeolite membrane may be lowered. The particle diameter of the DDR-type zeolite crystal particles formed on the surface of the porous substrate is a value measured by an electron microscope. In addition, the mass of the DDR-type zeolite crystal particles formed on the surface of the porous substrate is preferably 200 g/m$^2$ or less per unit area (m$^2$) of the surface of the porous substrate. When it is above 200 g/m$^2$, the resulting DDR membrane becomes too thick, which may extraordinarily decrease the permeation amount.

According to the process where plural DDR-type zeolite crystal particles are formed on the surface of the porous substrate by hydrothermal synthesis and where a DDR-type zeolite membrane is formed by hydrothermal synthesis with the particles as seed crystals, a zeolite crystal particles can be formed uniformly even on the surface of a porous substrate having a complex shape, and, by the hydrothermal synthesis with the particles as seed crystals, a DDR-type zeolite membrane can be formed uniformly.

The seed crystal-forming step may be performed plural times. In this case, after the seed crystal-forming step is performed plural times, a membrane-forming step is performed. In the case of performing the seed crystal-forming step plural times, it is preferable to use the seed crystal-forming raw material solution prepared each time the seed crystal-forming step.

(2) Membrane-Forming Step:

In a process of the production of DDR-type zeolite membrane of the present embodiment, the membrane-forming step is a step where a porous substrate having DDR-type zeolite crystal particles formed on the surface thereof is immersed in a membrane-forming raw material solution containing 1-adamantanamine, silica, water, and no DDR-type zeolite powder and where hydrothermal synthesis is performed to form a "DDR-type zeolite membrane" on the surface of the porous substrate. The DDR-type zeolite membrane formed on the surface of the porous substrate is obtained by the growth of the plural DDR-type zeolite crystal particles formed on the surface of the porous substrate to have a membrane shape by hydrothermal synthesis.

Thus, in the membrane-forming step, 1-adamantanamine, silica, and water are contained, and no DDR-type zeolite powder is contained in the membrane-forming raw material solution. If a DDR-type zeolite powder was contained in the membrane-forming raw material solution, the DDR-type zeolite powder in the raw material solution adhered to the portion where the DDR-type zeolite crystal particles were growing to have a membrane form on the surface of the porous substrate to form an aggregate in the portion, which caused a problem of hindering the membrane formation. In the process of the production of DDR-type zeolite membrane of the present embodiment, since no DDR-type zeolite powder is contained in the membrane-forming raw material solution, such an evil can be inhibited.

The membrane-forming raw material solution in the membrane-forming step contains 1-adamantanamine, silica, water, and no DDR-type zeolite powder. Ethylenediamine and other additives may be mixed in the solution. 1-adamantanamine is a structure directing agent for forming a DDR-type zeolite membrane. For example, when a slight amount of sodium aluminate is used as an additive, a part of Si constituting the DDR-type zeolite membrane can be substituted with Al. Such substitution enables to add catalysis and the like to the resulting DDR-type zeolite membrane in addition to a separation function. Upon preparing a membrane-forming raw material solution, the ratio of 1-adamantanamine to silica (1-adamantanamine/silica (molar ratio)) is preferably 0.002 to 0.5, further preferably 0.002 to 0.2. When the ratio is smaller than 0.002, 1-adamantanamine as the structure directing agent becomes insufficient to make the formation of DDR-type zeolite difficult. When the ratio is larger than 0.5, since the amount of 1-adamantanamine used increases, the production costs may increase. The ratio of water to silica (water/silica (molar ratio)) is preferably 10 to 500, further preferably 10 to 200. When the ratio is smaller than 10, the silica concentration is too high, which may make the formation of DDR-type zeolite difficult. When the ratio is larger than 500, the silica concentration is too low, which may make the formation of DDR-type zeolite difficult.

It is preferable that the membrane-forming raw material solution contains ethylenediamine. The preparation of the membrane-forming raw material solution with adding ethylenediamine enables to dissolve 1-adamantanamine easily and produce a DDR-type zeolite membrane having a uniform thickness. The ratio of ethylenediamine to 1-adamantanamine (ethylenediamine/1-adamantanamine (molar ratio)) is preferably 4 to 35, further preferably 8 to 32. When the ratio is smaller than 4, the amount of ethylenediamine is insufficient for easily dissolving 1-adamantanamine. When the ratio is larger than 35, the ethylenediamine not contributing to the reaction is superfluous, which may increase the production costs.

In addition, it is preferable to prepare 1-adamantanamine solution by dissolving 1-adamantanamine in ethylenediamine in advance. By the use of a membrane-forming raw material solution prepared by mixing the thus prepared 1-adamantanamine solution with the silica sol solution containing silica, it becomes possible to dissolve 1-adamantanamine more easily and completely and produce a DDR-type zeolite membrane having a uniform thickness. Incidentally, though the silica sol solution can be prepared by dissolving fine powder-formed silica in water or by subjecting alkoxide to hydrolysis, it is also possible to use a silica sol marketed product with adjusting the silica concentration.

As a method for the hydrothermal synthesis with immersing a porous substrate having DDR-type zeolite crystal particles formed on the surface thereof in a membrane-forming raw material solution, the following method can be employed.

Hydrothermal synthesis is performed by putting a porous substrate having DDR-type zeolite crystal particles formed on the surface thereof in a pressure resistant vessel or the like containing a membrane-forming raw material solution with maintaining it at the predetermined temperature described below for a predetermined period of time to form a DDR-type zeolite membrane on the surface of the porous substrate. In the membrane-forming step, the temperature for the hydrothermal synthesis is preferably 100 to 200° C., further preferably 100 to 150° C. When the hydrothermal synthesis is performed at a temperature below 100° C., the formation of DDR-type zeolite crystal particles may be difficult. When the hydrothermal synthesis is performed at a temperature above 200° C., a crystal phase different from that of DDR-type zeolite, such as DOH-type zeolite, may be formed.

The thickness of the DDR-type zeolite membrane formed on the surface of the porous substrate is preferably 0.1 to 100 μm. When the thickness is smaller than 0.1 μm, the strength of the DDR-type zeolite membrane may decrease. When the thickness is larger than 100 μm, the permeation rate at the time a fluid to be treated passes through the resulting DDR-type zeolite membrane may fall. The thickness of the DDR-type zeolite membrane is the average value of the thickness values measured at five points of an electron micrograph of a cross section taken along the thickness direction.

The membrane-forming step may be performed plural times. In the case of performing the membrane-forming step plural times, it is preferable to use the membrane-forming raw material solution prepared each time the membrane-forming step.

EXAMPLE

Hereinbelow, the present invention will be described more specifically with Examples. However, the present invention is by no means limited to these Examples.

Example 1

Production of DDR-Type Zeolite Powder

A DDR-type zeolite powder was produced on the basis of the process of the production of DDR-type zeolite described in "M. J. den Exter, J. C. Jansen, H. van Bekkum, Studies in Surface Science and Catalysis vol. 84, Ed. by J. Weitkamp et al., Elsevier (1994) 1159-1166", and the DDR-type zeolite crystal powder was pulverized. After the pulverized DDR-type zeolite crystal powder was dispersed in water, coarse particles were removed to prepare a DDR-type zeolite powder. The average particles size of the DDR-type zeolite powder (DDR-type zeolite crystal powder after the removal of the coarse particles) was 1 μm or less.

(Production of DDR-Type Zeolite Crystal Particles (Seeding))

After 10.93 g of ethylenediamine (produced by Wako Pure Chemical Industries, Ltd.) was put in a 100 ml (milliliter) jar made of fluorine resin, 1.719 g of 1-adamantanamine (produced by Sigma-Aldrich Corporation) (structure directing agent) was added to the ethylenediamine and dissolved lest precipitation of 1-adamantanamine should remain. In another container, 85.0 g of 30 mass % silica sol (Snowtex S produced by Nissan Chemical Industries, Ltd.) and 124.03 g of ion-exchange water were put and stirred, and the mixture was put in the jar where ethylenediamine and 1-adamantanamine were mixed together. They were mixed with strongly shaking to prepare a mixed solution. Then, the jar containing the mixed solution was set on a shaker to be shaken at 500 rpm for one hour. Then, 1000 μl (microliter) of a DDR-type zeolite powder dispersion liquid containing 0.337 mass % of a DDR-type zeolite powder was put in the mixture, and they were further shaken at 500 rpm for five minutes to obtain a seed crystal-forming raw material solution.

Figure 1:
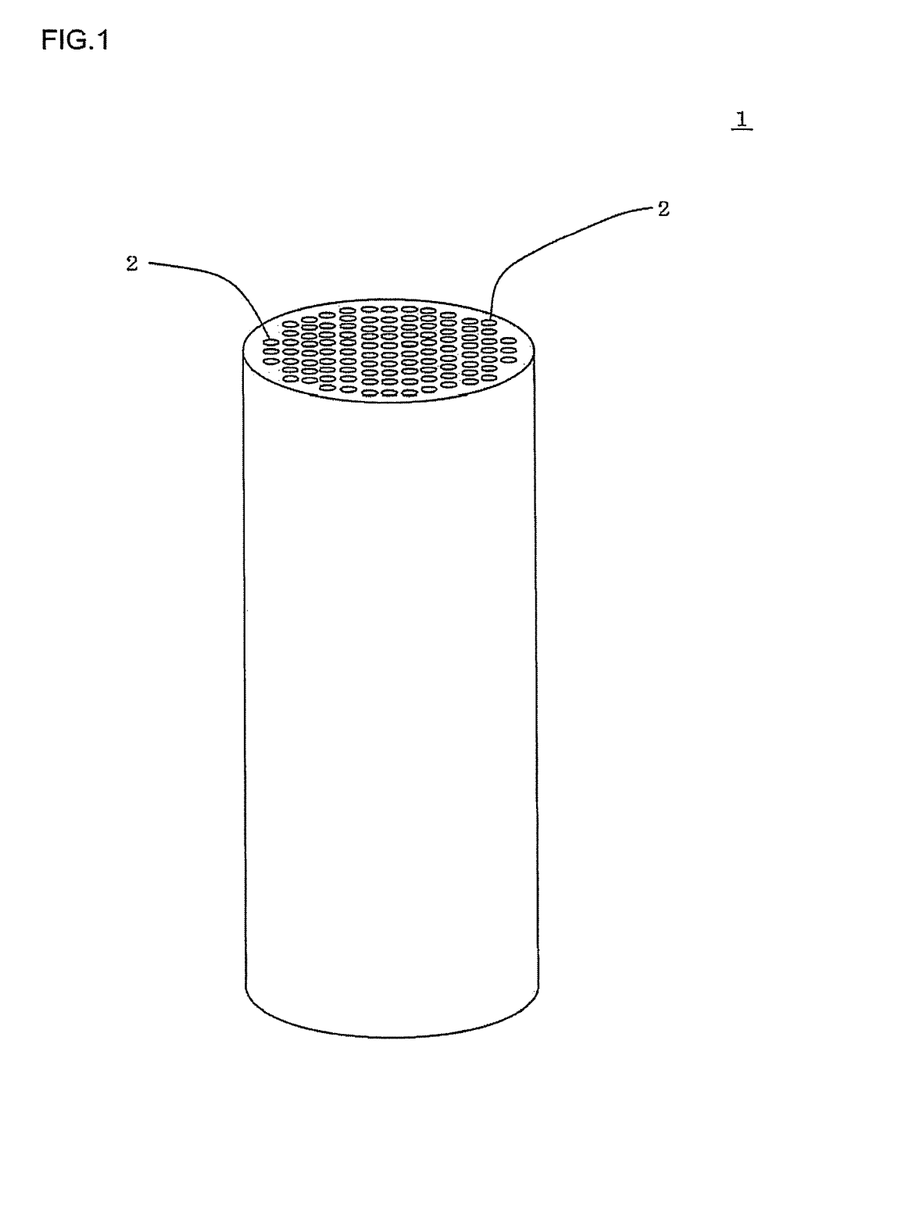
FIG. 1 is a perspective view schematically showing a porous substrate used in one embodiment of a process of the production of a DDR-type zeolite membrane of the present invention.

Then, a circular columnar monolith-shaped (lotus root-shaped) porous substrate 1 having plural through-holes 2 passing through in the central axial direction as shown in FIG. 1 was disposed in a stainless steel pressure resistant vessel with a fluorine resin inner cylinder having an inner capacity of 100 ml, and a seed crystal raw material solution was put for a heat treatment (hydrothermal synthesis) at 120° C. for 24 hours. After the heat treatment, washing with water and drying were performed to obtain plural DDR-type zeolite crystal particles (seed crystals) formed on the surface of the porous substrate. The hydrothermal synthesis was performed once. The DDR-type zeolite crystal particles did not form an aggregate which might adhere to the porous substrate or the inside of the stainless steel pressure resistant vessel. Incidentally, FIG. 1 is a perspective view schematically showing porous substrate 1 used in the Examples of a process of the production of DDR-type zeolite membrane of the present invention.

The porous substrate used had a circular columnar shape having a bottom face having a diameter of 30 mm and a length of 40 ram with 37 through-holes (each having a circular cross section perpendicular to the longitudinal direction and a diameter of 3 mm of the circular cross section) found therein.

(Production of DDR-Type Zeolite Membrane (Membrane Formation))

After 7.35 g of ethylenediamine (produced by Wako Pure Chemical Industries, Ltd.) was put in a 100 ml jar made of fluorine resin, 1.156 g of 1-adamantanamine (produced by Sigma-Aldrich Corporation) was added to the ethylenediamine and dissolved lest precipitation of 1-adamantanamine should remain. In another container, 98.0 g of 30 mass % silica sol (Snowtex S produced by Nissan Chemical Industries, Ltd.) and 116.55 g of ion-exchange water were put and stirred, and the mixture was put in the jar where ethylenediamine and 1-adamantanamine were mixed together. They were mixed with strongly shaking to prepare a membrane-forming raw material solution. Incidentally, no DDR-type zeolite powder was added to the membrane-forming raw material solution. Then, the jar containing the membrane-forming raw material solution was set on a shaker to be shaken at 500 rpm for one hour. Then, a "porous substrate having the DDR-type zeolite crystal particles formed on the surface thereof" was disposed in a stainless steel pressure resistant vessel with a fluorine inner cylinder having an inner capacity of 100 ml, and the membrane-forming raw material solution was put for a heat treatment (hydrothermal synthesis) at 150° C. for 84 hours. After the heat treatment, washing with water and drying were performed to obtain a "DDR-type zeolite membrane" formed on the surface of the porous substrate.

(Removal of Structure Directing Agent)

Then, the porous substrate having the "DDR-type zeolite membrane" formed thereon was put in an electric furnace and heated at 500° C. for 50 hours in the air atmosphere to remove 1-adamantanamine in pores of the DDR-type zeolite membrane by combustion. Thus, the DDR-type zeolite membrane formed on the surface of the porous substrate was obtained.

Regarding the "DDR-type zeolite membrane" after the membrane-forming step, the "helium permeation amount measurement" was performed by the following method. Further, regarding the DDR-type zeolite membrane obtained after the removal of the structure directing agent, the "X-ray diffraction measurement" and the "gas permeation test" were performed by the following methods. The results are shown in Table 1. In addition, regarding the "particle adhesion" of Table 1, "present" was given to the case where the DDR-type zeolite crystal particles formed an aggregate to adhere to the porous substrate or the inside of the stainless steel pressure resistant vessel, and "none" was given to the case where no particle adhesion was caused.

(Helium (He) Permeation Amount Measurement)

He gas was brought into contact with the surface (surface on the side of not contacting the porous substrate) of the DDR-type zeolite membrane after the membrane-forming step to measure the amount of gas passing through the DDR-type zeolite membrane. The He permeation amount (L/(min.·m$^2$·kPa)) was calculated from the flow rate of He gas sent upon measurement and the pressure. It was calculated by the formula of "He permeation amount=He flow amount/hour/membrane area/pressure".

(X-Ray Diffraction Measurement)

The crystal phase of the DDR-type zeolite membrane after the removal of the structure directing agent was subjected to the X-ray diffraction measurement to confirm the formation of DDR-type zeolite. The crystal phase of each of the DDR-type zeolite membranes obtained by the processes of the production of a DDR-type zeolite membrane of Examples 1 to 18 and Comparative Examples 1 and 2 was evaluated to detect only the diffraction peaks of DDR-type zeolite and alumina serving as the porous substrate. Incidentally, the "diffraction peak of DDR-type zeolite" in the X-ray diffraction means the diffraction peak described in No. 38-651 or No. 41-571 corresponding to "Deca-dodecasil 3R" shown in International Center for Diffraction Data (ICDD) "Powder Diffraction File". This enabled to confirm the formation of the DDR-type zeolite membrane in Examples 1 to 18 and Comparative Examples 1 and 2.

(Microstructure Observation)

The "plurality of DDR-type zeolite crystal particles formed on the surface of the porous substrate" and the "DDR-type zeolite membrane" after the removal of the structure directing agent were observed by an electron microscope. As the electron microscope, JSM-5410 produced by JEOL Ltd. was used.

(Gas Permeation Test)

A mixed gas of carbon dioxide ($CO_2$) and methane ($CH_4$) (with volume ratio of 50:50 and partial pressure of each gas of 0.3 MPa) was brought into contact with the surface (surface on the side of not contacting the porous substrate) of the DDR-type zeolite membrane after the removal of the structure directing agent to measure the amount of gas passing through the DDR-type zeolite membrane. Table 1 shows the permeation amount of $CO_2$, "$CO_2$ permeation amount". Further, the gas having passed through the DDR-type zeolite membrane was collected, and the component analysis was performed by using a gas chromatography. Then, the permeation amounts ($\times 10^{-9}$ mole/(m$^2$·Pa·s)) of carbon dioxide ($CO_2$) and methane ($CH_4$) and the separation coefficient α of "carbon dioxide/methane" were calculated. The separation coefficient α is a value obtained by the calculation using the formula of Separation coefficient α=(permeated $CO_2$ concentration/permeated $CH_4$ concentration)/(fed $CO_2$ concentration/fed $CH_4$ concentration). In Table 1, the separation coefficient α is shown in the column of "$CO_2/CH_4$ separation coefficient".

TABLE 1

| | Substrate length mm | DDR powder concentration (mass %) | Seeding Temperature (°C.) | Period of time (h) | Number of operation (time(s)) | Membrane formation Temperature (°C.) | Period of time (h) | Number of operation (time(s)) |
|---|---|---|---|---|---|---|---|---|
| Example 1 | 40 | 0.337 | 120 | 24 | 1 | 150 | 84 | 1 |
| Example 2 | 40 | 0.337 | 120 | 48 | 2 | 120 | 84 | 2 |
| Example 3 | 40 | 0.337 | 120 | 48 | 1 | 135 | 48 | 1 |
| Example 4 | 40 | 0.337 | 120 | 48 | 1 | 135 | 84 | 1 |
| Example 5 | 40 | 0.337 | 120 | 48 | 1 | 150 | 84 | 1 |
| Example 6 | 40 | 0.337 | 135 | 12 | 1 | 135 | 120 | 1 |
| Example 7 | 40 | 0.337 | 135 | 12 | 1 | 150 | 84 | 1 |
| Example 8 | 40 | 0.337 | 135 | 24 | 1 | 120 | 84 | 1 |
| Example 9 | 40 | 0.337 | 135 | 24 | 1 | 135 | 120 | 1 |
| Example 10 | 40 | 0.337 | 135 | 24 | 1 | 150 | 84 | 1 |
| Example 11 | 40 | 0.337 | 150 | 8 | 1 | 135 | 120 | 1 |
| Example 12 | 40 | 0.337 | 150 | 12 | 1 | 120 | 84 | 1 |
| Example 13 | 160 | 0.337 | 120 | 48 | 1 | 120 | 84 | 1 |
| Example 14 | 160 | 0.337 | 120 | 48 | 1 | 120 | 84 | 2 |
| Example 15 | 160 | 0.337 | 120 | 48 | 1 | 135 | 48 | 2 |
| Example 16 | 160 | 0.337 | 120 | 48 | 1 | 135 | 84 | 1 |
| Example 17 | 160 | 16.85 | 120 | 24 | 1 | 135 | 48 | 1 |
| Example 18 | 160 | 16.85 | 135 | 24 | 1 | 135 | 48 | 1 |
| Comp. Ex. 1 | 160 | 0.337 | — | — | — | 135 | 96 | 1 |
| Comp. Ex. 2 | 160 | 0.337 | — | — | — | 120 | 120 | 1 |

| | Membrane thickness | Particle adhesion | He permeation amount L/(min.·m$^2$·kPa) | $CO_2/CH_4$ separation coefficient | $CO_2$ permeation amount ×10$^{-9}$ mole/(m$^2$·Pa·s) |
|---|---|---|---|---|---|
| Example 1 | 15 | None | <0.018 | 3 | 112 |
| Example 2 | — | None | <0.018 | 8 | 33 |
| Example 3 | 20 | None | <0.018 | 59 | 85 |
| Example 4 | 40 | None | <0.018 | 186 | 50 |
| Example 5 | 40 | None | <0.018 | 148 | 37 |

TABLE 1-continued

| | | | | | |
|---|---|---|---|---|---|
| Example 6 | — | None | <0.018 | 59 | 43 |
| Example 7 | 30 | None | <0.018 | 3 | 40 |
| Example 8 | 10 | None | <0.018 | 25 | 81 |
| Example 9 | — | None | <0.018 | 62 | 37 |
| Example 10 | 40 | None | <0.018 | 30 | 29 |
| Example 11 | — | None | <0.018 | 6 | 48 |
| Example 12 | 20 | None | <0.018 | 5 | 93 |
| Example 13 | 10 | None | <0.018 | 72 | 59 |
| Example 14 | 40 | None | <0.018 | 66 | 37 |
| Example 15 | — | None | <0.018 | 66 | 25 |
| Example 16 | — | None | <0.018 | 190 | 46 |
| Example 17 | 2 | None | <0.018 | 5 | 130 |
| Example 18 | 6 | None | <0.018 | 13 | 81 |
| Comp. Ex. 1 | 20 | Present | 0.07 | 1 | 145 |
| Comp. Ex. 2 | 20 | Present | 0.05 | 1 | 135 |

Examples 2 to 12

Each of the DDR-type zeolite membranes was produced in the same manner as in Example 1 except that the DDR-type zeolite powder concentration of DDR-type zeolite powder dispersion liquid and the temperature, period of time, and number of hydrothermal synthesis upon the production (seeding) of DDR-type zeolite crystal particles were changed as shown in Table 1 and that the temperature, period of time, and number of hydrothermal synthesis upon the production (membrane formation) of DDR-type zeolite membrane were changed as shown in Table 1. In the same manner as in Example 1, there were performed presence/absence detection of "particle adhesion", "helium (He) permeation amount" of the DDR-type zeolite membrane after the membrane-forming step, and "X-ray diffraction measurement" and "gas permeation test" of the DDR-type zeolite membrane after the removal of the structure directing agent. The results except for "X-ray diffraction measurement" are shown in Table 1. In the column of the "substrate length" of Table 1 is shown the length in the central axial direction of "porous substrate where a DDR-type zeolite membrane was formed".

Examples 13 to 18

Each of the DDR-type zeolite membranes was produced in the same manner as in Example 1 except that the length in the central axial direction of the "porous substrate where a DDR-type zeolite membrane was to be formed" was 160 mm, that a stainless steel pressure resistant vessel with a fluorine resin inner cylinder having an inner capacity of 300 ml, that the DDR-type zeolite powder concentration of DDR-type zeolite powder dispersion liquid and the temperature, period of time, and number of hydrothermal synthesis upon the production (seeding) of DDR-type zeolite crystal particles were changed as shown in Table 1, and that the temperature, period of time, and number of hydrothermal synthesis upon the production (membrane formation) of DDR-type zeolite membrane were changed as shown in Table 1. In the same manner as in Example 1, there were performed presence/absence detection of "particle adhesion", "helium (He) permeation amount" of the DDR-type zeolite membrane after the membrane-forming step, and "X-ray diffraction measurement" and "gas permeation test" of the DDR-type zeolite membrane after the removal of the structure directing agent. The results except for "X-ray diffraction measurement" are shown in Table 1.

Figure 2:
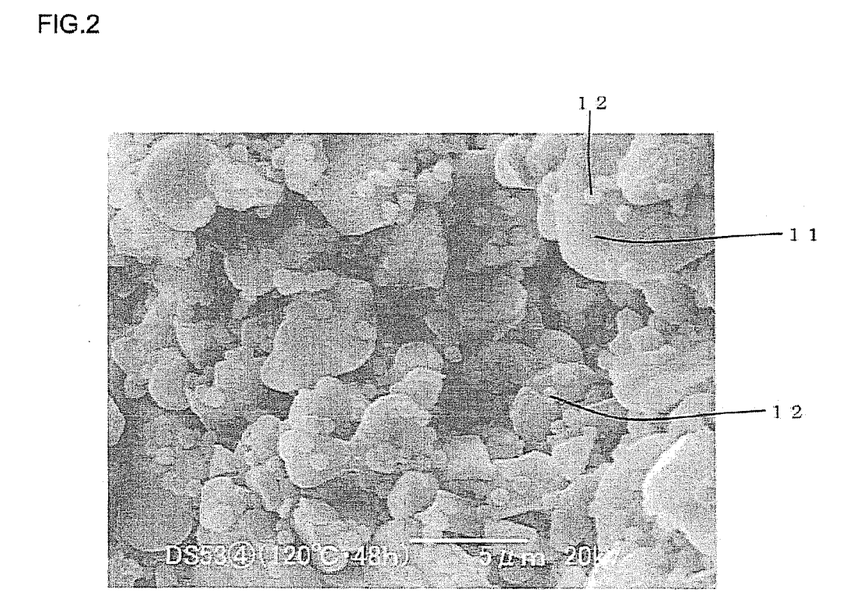
FIG. 2 is a micrograph of "plural DDR-type zeolite crystal particles formed on a surface of the porous substrate" obtained in the process of the production of a DDR-type zeolite membrane of Example 13.
Figure 3:
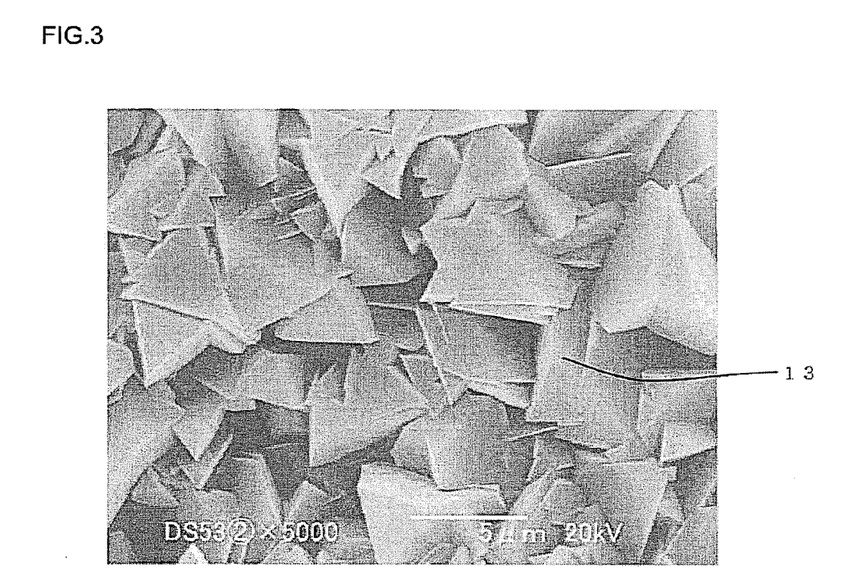
FIG. 3 is a micrograph of a DDR-type zeolite membrane obtained in the process of the production of a DDR-type zeolite membrane of Example 13.

In addition, in the process of the production of DDR-type zeolite membrane of Example 13, "plural DDR-type zeolite crystal particles formed on the surface of the porous substrate" obtained in the process of the production of a DDR-type zeolite membrane were subjected to the "microstructure observation" in the aforementioned method to confirm the state of DDR-type zeolite crystal particles. The electron micrograph obtained is shown in FIG. 2. From FIG. 2, it can be understood that plural DDR-type zeolite crystal particles 12 were formed on the surface of the porous substrate 11. FIG. 2 is a micrograph of "plural DDR-type zeolite crystal particles formed on the surface of the porous substrate" obtained in the production process in the process of the production of the DDR-type zeolite membrane of Example 13. In addition, the DDR-type zeolite membrane obtained in the process of the production of DDR-type zeolite membrane of Example 13 was subjected to "microstructure observation" to confirm the state of DDR-type zeolite membrane. The electron micrograph obtained by the "microstructure observation" is shown in FIG. 3. From FIG. 3, it can be understood that DDR-type zeolite was crystallized to form a dense membrane and that the surface of the porous substrate is covered with a dense DDR-type zeolite membrane. FIG. 3 is a micrograph of a DDR-type zeolite membrane obtained in the process of the production of DDR-type zeolite membrane of Example 13.

Comparative Example 1

After 10.93 g of ethylenediamine (Wako Pure Chemical Industries, Ltd.) was put in a 100 ml (milliliter) jar made of fluorine resin, 1.719 g of 1-adamantanamine (produced by Sigma-Aldrich Corporation) was added to the ethylenediamine and dissolved lest precipitation of 1-adamantanamine should remain. In another container, 85.0 g of 30 mass % silica sol (Snowtex S produced by Nissan Chemical Industries, Ltd.) and 124.03 g of ion-exchange water were put and stirred, and the mixture was put in the jar where ethylenediamine and 1-adamantanamine were mixed together. They were mixed with strongly shaking to prepare a mixed solution. Then, the jar containing the mixed solution was set on a shaker to be shaken at 500 rpm for one hour. Then, 1000 µl (microliter) of a DDR-type zeolite powder dispersion liquid containing 0.337 mass % of a DDR-type zeolite powder was put in the mixture, and they were further shaken at 500 rpm for five minutes to obtain a membrane-forming raw material solution. A porous substrate having no DDR-type zeolite crystal particle was disposed in a stainless steel pressure resistant vessel with a fluorine resin inner cylinder having an inner capacity of 300 ml, and the membrane-forming raw material solution was put for a heat treatment (hydrothermal synthesis) at 135° C. for 96 hours. After the heat treatment, washing with water and drying were performed to obtain a "DDR-type zeolite membrane" formed on the surface of the porous substrate. The porous substrate used had a circular columnar shape having a bottom face having a diameter of 30 mm and a length of 160 mm with 37 through-holes (each having a circular cross section perpendicular to the longitudinal direction and a diameter of 3 mm of the circular cross section) formed therein. In the same manner as in Example 1, there were performed presence/absence detection of "particle adhesion", "helium (He) permeation amount" after the membrane-forming step, and "X-ray diffraction measurement" and "gas permeation test" after the removal of the structure directing agent. The results except for "X-ray diffraction measurement" are shown in Table 1.

Comparative Example 2

A DDR-type zeolite membrane was produced in the same manner as in Comparative Example 1 except that the temperature and period of time of the hydrothermal synthesis were changed as shown in Table 1. In the same manner as in Example 1, there were performed presence/absence detection of "particle adhesion", "helium (He) permeation amount" after the membrane-forming step, and "X-ray diffraction measurement" and "gas permeation test" after the removal of the structure directing agent. The results except for "X-ray diffraction measurement" are shown in Table 1.

In each of the processes of the production of DDR-type zeolite membrane of Examples 1 to 18, when the "DDR-type zeolite membrane" was formed on the surface of the porous substrate, the DDR-type zeolite crystal particles did not adhere to the porous substrate or the inside of the stainless steel pressure resistant vessel as an aggregate. In addition, there could be obtained a dense DDR-type zeolite membrane with no membrane formation defect. In addition, no damage was found in the synthesis vessel. In contrast, in each of the process of the production of DDR-type zeolite membrane of Comparative Examples 1 and 2, DDR-type zeolite crystal particles formed an aggregate, and a large amount of the particles precipitated in the porous substrate and the inside of the stainless steel pressure resistant vessel to cause clogging of pores of the DDR-type zeolite membrane due to adhesion of the aggregates of zeolite crystal particles.

In addition, in each of the processes of the production of DDR-type zeolite membrane of Examples 1 to 18, the helium permeation amount in the "helium permeation amount measurement" of the "DDR-type zeolite membrane" after the membrane-forming step was not larger than the measurement limit, and it can be understood that a "DDR-type zeolite membrane" with no defect could be obtained. In contrast, in each of the process of the production of DDR-type zeolite membrane of Comparative Examples 1 and 2, since the helium permeation amount in the "helium permeation amount measurement" of the "DDR-type zeolite membrane" after the membrane-forming step is large, it can be understood that a defect was caused in the "DDR-type zeolite membrane".

INDUSTRIAL APPLICABILITY

A process of the production of DDR-type zeolite membrane of the present invention can suitably be used for Production of a DR-type zeolite membrane.

DESCRIPTION OF REFERENCE NUMERALS 1, 11: porous substrate, 2: through-hole, 12: DDR-type zeolite crystal particle, 13: DDR-type zeolite membrane

The invention claimed is:

1. A process for the production of DDR-type zeolite membranes, comprising:
a seed crystal-forming step of immersing a porous substrate in a seed crystal-forming raw material solution containing 1-adamantanamine, silica, water, and a DDR-type zeolite powder dispersed therein and performing hydrothermal synthesis to form plural DDR-type zeolite crystal particles on a surface of the porous substrate; and
a membrane-forming step of immersing the porous substrate with DDR-type zeolite crystal particles formed on the surface thereof in the membrane-forming raw material solution containing 1-adamantanamine, silica, water, and no DDR-type zeolite powder and performing hydrothermal synthesis to form a DDR-type zeolite membrane on the surface of the porous substrate.

2. A process for the production of a DDR-type zeolite membrane according to claim 1, wherein the seed crystal-forming step is performed plural times with preparing the seed crystal-forming raw material solution each time the seed crystal-forming step is performed.

3. A process for the production of a DDR-type zeolite membrane according to claim 1, wherein the membrane-forming step is performed plural times with preparing the membrane-forming raw material solution each time the membrane-forming step is performed.

4. A process for the production of a DDR-type zeolite membrane according to claim 1, wherein ethylenediamine is contained in both the seed crystal-forming raw material solution used in the seed crystal-forming step and the membrane-forming raw material solution used in the membrane-forming step.

5. A process for the production of a DDR-type zeolite membrane according to claim 1, wherein the hydrothermal synthesis in the seed crystal-forming step and the hydrothermal synthesis in the membrane-forming step are performed at 100 to 200° C.

6. A process for the production of a DDR-type zeolite membrane according to claim 1, wherein the resulting DDR-type zeolite membrane has a thickness of 0.1 to 100 μm.

7. A process for the production of a DDR-type zeolite membrane according to claim 2, wherein the membrane-forming step is performed plural times with preparing the membrane-forming raw material solution each time the membrane-forming step is performed.

8. A process for the production of a DDR-type zeolite membrane according to claim 7, wherein ethylenediamine is contained in both the seed crystal-forming raw material solution used in the seed crystal-forming step and the membrane-forming raw material solution used in the membrane-forming step.

9. A process for the production of a DDR-type zeolite membrane according to claim 8, wherein the hydrothermal synthesis in the seed crystal-forming step and the hydrothermal synthesis in the membrane-forming step are performed at 100 to 200° C.

10. A process for the production of a DDR-type zeolite membrane according to claim 9, wherein the resulting DDR-type zeolite membrane has a thickness of 0.1 to 100 μm.

11. A process for the production of a DDR-type zeolite membrane according to claim 3, wherein ethylenediamine is contained in both the seed crystal-forming raw material solution used in the seed crystal-forming step and the membrane-forming raw material solution used in the membrane-forming step.

12. A process for the production of a DDR-type zeolite membrane according to claim 2, wherein ethylenediamine is contained in both the seed crystal-forming raw material solution used in the seed crystal-forming step and the membrane-forming raw material solution used in the membrane-forming step.

13. A process for the production of a DDR-type zeolite membrane according to claim 4, wherein the hydrothermal synthesis in the seed crystal-forming step and the hydrothermal synthesis in the membrane-forming step are performed at 100 to 200° C.

14. A process for the production of a DDR-type zeolite membrane according to claim 3, wherein the hydrothermal synthesis in the seed crystal-forming step and the hydrothermal synthesis in the membrane-forming step are performed at 100 to 200° C.

15. A process for the production of a DDR-type zeolite membrane according to claim 2, wherein the hydrothermal synthesis in the seed crystal-forming step and the hydrothermal synthesis in the membrane-forming step are performed at 100 to 200° C.

16. A process for the production of a DDR-type zeolite membrane according to claim 5, wherein the resulting DDR-type zeolite membrane has a thickness of 0.1 to 100 μm.

17. A process for the production of a DDR-type zeolite membrane according to claim 4, wherein the resulting DDR-type zeolite membrane has a thickness of 0.1 to 100 μm.

18. A process for the production of a DDR-type zeolite membrane according to claim 11, wherein the resulting DDR-type zeolite membrane has a thickness of 0.1 to 100 μm.

19. A process for the production of a DDR-type zeolite membrane according to claim 13, wherein the resulting DDR-type zeolite membrane has a thickness of 0.1 to 100 μm.

* * * * *